United States Patent
Itria

[11] 3,837,424
[45] Sept. 24, 1974

[54] HIGHLY PENETRATING SEISMIC ENERGY SOUND GENERATOR WITH PULSE SHAPING FOR OFFSHORE SUBSURFACE EXPLORATION

[75] Inventor: Oswald A. Itria, Bellaire, Tex.
[73] Assignee: Texaco Inc., New York, N.Y.
[22] Filed: Jan. 26, 1972
[21] Appl. No.: 220,941

[52] U.S. Cl............................ 181/0.5 H, 181/0.5 A
[51] Int. Cl............................................... G01v 1/38
[58] Field of Search........ 181/0.5 XC, 0.5 A, 0.5 H; 340/3 T

[56] References Cited
UNITED STATES PATENTS
2,877,859   3/1959   Knudsen..................... 181/0.5 XC
3,525,416   8/1970   Mott-Smith................... 181/0.5 H Primary Examiner—Benjamin A. Borchelt
Assistant Examiner—J. V. Doramus
Attorney, Agent, or Firm—T. H. Whaley; C. G. Ries

[57] ABSTRACT

A method of increasing the useful seismic energy in a generated primary pulse and at least one article for carrying out the method is disclosed. The article comprises a pneumatic sound generator, as an air gun for generating a primary seismic pulse and an openended elongated cylinder surrounding the air gun and having an end opening are nearest the air gun exhaust ports greater than the area of said ports for shaping the primary pulse so that its dominate frequency will be lowered, placing more of the energy in the useful seismic frequency range, resulting in greater penetration of the seismic signal within the sedimentary section.

13 Claims, 4 Drawing Figures

PATENTED SEP 24 1974　　　　　　　　　　　3,837,424

HIGHLY PENETRATING SEISMIC ENERGY SOUND GENERATOR WITH PULSE SHAPING FOR OFFSHORE SUBSURFACE EXPLORATION

BACKGROUND OF THE INVENTION

Broadly the present invention relates to seismic exploration and to an improved pneumatic marine seismic energy source or sound generator for the introduction of seismic energy into water from a floating vessel for supplying compressed air and having a geophysical crew thereon for exploring earth layers and formations underlying bodies of water as oceans, seas, lakes, rivers, or the like. More particularly this invention pertains to a seismic pneumatic energy source with a cylindrical attachment for increasing the useful seismic energy in a generated primary seismic pulse.

While the method and apparatus for the invention are applicable for many purposes as will be set forth further below, they are illustratively disclosed and described as applied to underwater sound instrumentation such as oceanographic equipment and systems that are employed in seismic exploration of the world's crust under and adjacent to bodies of water.

Since water is such a good sound conductor, it is unnecessary to generate sound waves right on or in the ocean floor; they can be produced in the water near the surface. The pressure waves travel down through the water to the ocean floor and are reflected as in the usual echo-sounding techniques. However, these waves also penetrate into the ocean floor and are reflected from the sub-strata. These acoustical waves also propagate horizontally through one or more geological strata and may be recorded at a distance from the source, thus providing useful refraction data on the stratum or strata involved.

Although explosives for marine seismic work can put large amounts of energy into the water and obtain great depth of penetration, they do have drawbacks; they are dangerous to handle and use, and in some areas such as congested harbors, they cannot be used at all. Also, each "shot" costs money which can run into many thousands of dollars per survey. Explosives tend generally to concentrate substantial amounts of their energy output into higher frequency components which may not be desirable for many purposes; whereas, the sound impulse generation method and apparatus for the present invention can be adjusted over a large amplitude range and adjusted in frequency so as to provide the desired spectrum distribution of sound frequencies for the purpose at hand. The method and apparatus of the present invention provide a great flexibility in operation; the sound intensity and characteristics can be conveniently adjusted by adjusting the pressures and volumes of compressed air being released.

The present invention is illustratively described as embodied in a device capable of emitting a large amount of acoustical energy into water in the form of a clear, repeatable pulse, the frequency and amplitude of which may be readily averred. These powerful sound impulses are well adapted for use in seismic exploration systems and also can be used to advantage for other purposes.

Seismic surveys which are conducted over water covered areas use various methods for generating seismic energy as by the detonating of conventional powder or dynamite, or gas mixtures, electrical discharge of sparks to ionize a portion of the water surrounding the electrode, or suddenly releasing a container of high pressure air underwater for generating a large seismic or pressure wave signal. These seismic signals are reflected from subsurface geological formations and structures and are received by seismometers and recorded.

In all methods utilized, it is customary to tow one or more detectors through the water in the vicinity of the sound source to detect the signals that are reflected from the various subsurface formations and structures. The detected signals are recorded on suitable equipment contained on the towing vessels, either in the form of analog or digital signals. Also, at times the signals are recorded as variable area signals to provide a profile of the surveyed area. The latter recording is similar to those contained with conventional depth-sounding equipment.

All of the above seismic methods and devices have various disadvantages and thus none is completely suitable for use in all circumstances. The handling of an explosive material is, of course, dangerous as mentioned previously, wherein the explosions themselves tend to kill marine life, an example being disclosed in U.S. Pat. No. 2,877,859. Also, in the case of dynamite two separate vessels are required; one for handling the dynamite and the other for the recording equipment. This, of course, increases the cost of the survey. The use of explosive gas mixture solves some of the problems that arise with dynamite, since explosive gas mixtures do not kill as much marine life, a further example being disclosed in U.S. Pat. No. 3,620,327. Normally, gas mixtures can be stored as separate, non-explosive gases on the same vessel that contains the recording equipment. Thus, the need for an additional vessel or the possibility of killing marine life is reduced. The one disadvantage of gas type sound sources is the relatively short life of the flexible container or sleeve in which the explosive gas mixtures are detonated. Conservation of the present environment is one of the principal problems.

In sound sources employing an electrical discharge, it has been customary to discharge a bank of capacitors charged to a high voltage through a single electrode or multiple parallel electrodes and a ground plate. When the capacitor bank is discharged into the water by the electrodes and ground plate the pressure bubble is produced at each electrode tip, for the ground plate serves as a return for the electrical energy. The pressure bubble produces the desired seismic impulse while the ground adds nothing to the magnitude of the outgoing acoustical wave. In fact, only 3–5 percent of the total electrical energy available in the capacitor bank is converted to useful acoustical energy in the water. Further, many spark electrodes in parallel may be used simultaneously as disclosed in U.S. Pat. No. 3,613,823.

However, a problem that most of the seismic systems have, including the above, is the obtaining of more useful seismic energy from the generated primary pulse for greater penetration of the seismic signal within the sedimentary section or earth's crust.

OBJECTS OF THE INVENTION

A primary object of this invention is to provide a method for increasing the useful seismic energy in a generated primary pulse.

Another primary object of this invention is to provide a mechanism for carrying out the method for increasing the useful seismic energy in a generated principal pulse.

A further object of this invention is to provide a mechanism for shaping the primary pulse so that its dominate frequency will be lowered.

A still further object of this invention is to provide a seismic sound generator with a cylinder having an opening area greater than the exhaust port area of the energy source for shaping the primary pulse so that its dominate frequency will be lowered for placing more of the energy into the useful seismic range which results in greater penetration of the seismic signal within the sedimentary section.

Another object of this invention is to provide a seismic sound generator that is easy to operate, is of simple configuration, is economical to build and assemble, and is of greater efficiency for generating a primary pulse for greater penetration of the seismic signal within the sedimentary section.

Other objects and various advantages of the disclosed seismic sound generator with pulse shaping for offshore subsurface exploration will be apparent from the following detailed description, together with accompanying drawing, submitted for purposes of illustration only and not intended to define the scope of the invention, reference being had for that purpose to the subjoined claims.

BRIEF DESCRIPTION OF THE DRAWING

The drawing diagrammatically illustrates by way of example, not by way of limitation, one form of the invention wherein like reference numerals have been employed to indicate similar parts in the several views in which.

DESCRIPTION OF THE PREFERRED EMBODIMENT

The invention disclosed herein, the scope of which being defined in the appended claims, is not limited in its application to the details of construction and arrangement of parts shown and described for carrying out the method, since the invention is capable of other embodiments for carrying out other methods and of being practiced or carried out in various other ways. Also, it is to be understood that the phraseology or terminology employed herein is for the purpose of description and not of limitation. Further, many modifications and variations of the invention as hereinbefore set forth will occur to those skilled in the art. Therefore, all such modifications and variations which are within the spirit and scope of the invention herein are included and only such limitations should be imposed as are indicated in the appended claims.

The shape of the primary seismic pulse generated by the discharge of an explosive device such as an air gun in water is determined primarily by the size of the air guns' port and throat areas, the rate of discharge of the air or gas into the surrounding water, the gas pressure and the reservoir chamber, and the volume of air discharged into the water. If a particular design of air gun is operated at the same air pressure and chamber volume of gas, it can be predicted that the generated primary pulse shpae will be repeatable. Changing the charging pressure of the air chamber, other than altering the amplitude of the primary pulse will not have any significant effect on the time duration of the primary pulse.

Figure 1:
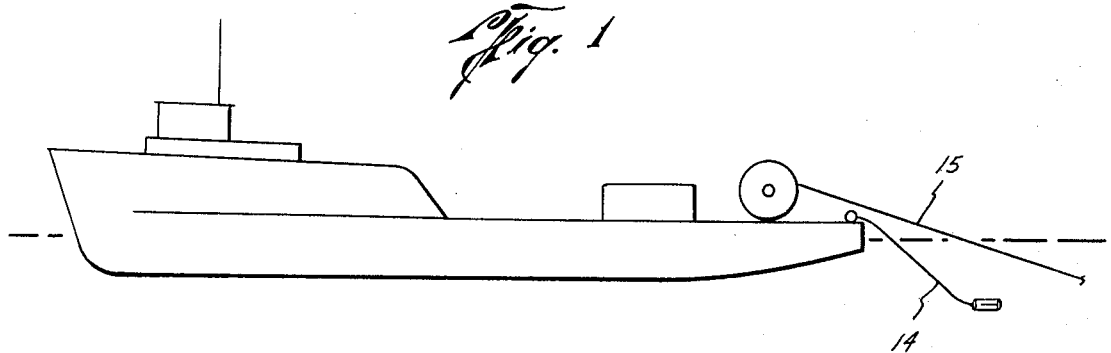
FIG. 1 is a schematic view of the invention while being towed underwater on a seismic exploration survey.

FIG. 1 shows the invention as it is being towed through the water on a seismic exploration survey.

The invention comprises a method for increasing the seismic energy in a generated primary pulse from the exhaust ports of a sound generator device, whether it be an explosive or an air gun, or the like. The method comprises shaping the pulse so that its dominate frequency will be lowered for placing more of the energy into the useful seismic frequency range. A method of accomplishing this is generating the primary pulse in a submerged, open-ended cylinder for so shaping the pulse.

Figure 2:
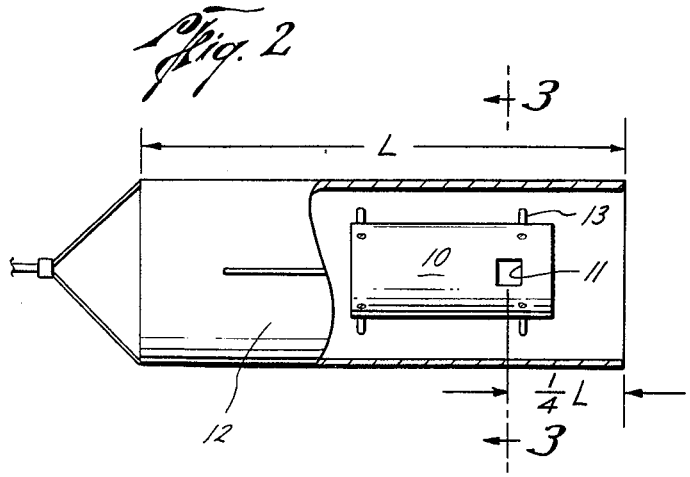
FIG. 2 is a schematic detailed view of the invention with parts in section for clarity of disclosure.
Figure 3:
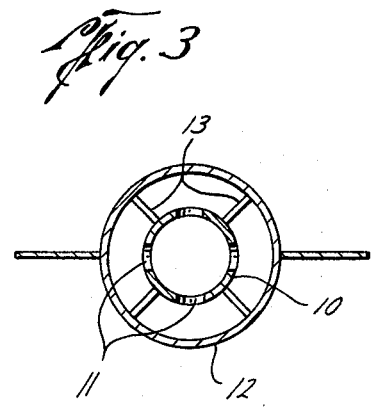
FIG. 3 is a sectional view at 3—3 on FIG. 2.

At least one mechanism for carrying out the above method is illustrated in FIG. 2, wherein the invention is disclosed in greater detail. A conventional energy means or device, sound generator, or air gun 10 is illustrated such as but not limited to an air gun of the type as model 1,500A, 120 cubic inch air gun operating under pressures from 750 psi to 2,000 psi, manufactured by the Bolt Associates, Inc., Norwalk, Connecticut, having four outlet or exhaust ports 11, one in each of the four radial directions, FIG. 3, only the left port being shown in FIG. 2. Mounted around the air gun is an open-ended cylinder 12. Conventional struts 13 fixedly mount the air gun in the cylinder with its ports positioned one-quarter of the cylinder length "L" from the aft end of the cylinder. An early model manufactured by the inventor consisted of an air gun mounted internally of an oil field caisson which was four feet long with the gun exhaust ports mounted one foot from the stern of the cylinder or casing. This casing had an inside diameter of 11 inches.

Figure 4:
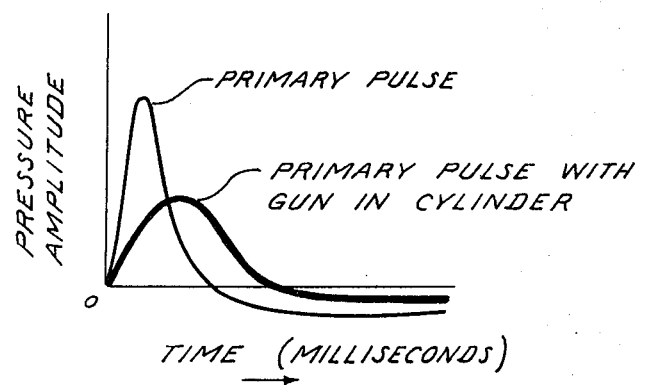
FIG. 4 is a set of typical curves of the pulse shape with and without the new cylinder attachment.

A tow line 14, FIG. 1, is provided which includes a conventional air hose and solenoid cable for the air gun. A cable 15 is illustrated for pulling a geophone (not shown). FIG. 4 shows a typical graph of the results of firing the air gun alone in the water and again with the air gun inside of the cylinder. One curve shows the primary pulse from the first firing having a high amplitude and occurring in a small short period of time. This primary pulse is the result of a conventional air gun being fired underwater. The second primary pulse illustrated with a heavier line was the result of the cylinder being mounted over the gun, and has a lower amplitude and lower resulting frequency and shaped over a longer period of time, as shown.

The result is a sound generator, as an air gun in the instant case, for discharging a mass of air suddenly into a confined but larger volume of water, as that contained by the large diameter cylinder prior to releasing this mass of air into an unconfined volume of water. The expansion of this air within the confines of the enclosing pipe, tube, cylinder, or confining apparatus, allows the air pressure to drop to a substantially lower pressure before the expanding air, which is driving the fluid out of the pipe, makes physical contact with the surrounding, unconfined liquid. Furthermore, what is most important, however, this air which is now at a reduced pressure is applied to an exit area larger than the port area of the gun, i.e., the nearest open end of the confining pipe or cylindrical attachment. The result is a primary pulse of lower, more penetrating frequency.

Thus, the generated primary pulse can be shaped so that it will contain more seismic energy in the lower, more usable seismic range of the frequency spectrum. Further, greater penetration is provided of the seismic signal within the sedimentary section.

While any type of sound generator may be utilized, as explosives, air guns, etc., the preferred type is an air gun. The primary pulse shape may be varied. Increasing the diameter of the pipe produces lower amplitude and produces lower frequency which results in lower pressure of air and lengthening of the time period.

Accordingly, it will be seen that the present seismic energy source with pulse shaping for offshore subsurface exploration operates in a manner which meets each of the objects set forth hereinbefore.

While only one method and one embodiment for carrying out the method of the invention have been disclosed, it will be evident that various other modifications are possible in the arrangement and construction of the disclosed seismic energy source with pulse shaping for offshore subsurface exploration without departing from the scope of the invention, and it is accordingly desired to comprehend within the purview of this invention such modifications as may be considered to fall within the scope of the appended claims.

I claim:

1. In offshore marine exploration, a method for increasing the useful seismic energy in a generated primary pulse for providing deeper penetration by lowering the dominate frequency thereof comprising the steps of,
    a. positioning an exhaust port of a sound generator in one end of a submerged open-ended cylinder, and
    b. energizing the sound generator for lowering the dominate frequency of the generated seismic primary pulse which places more of the energy in the useful seismic frequency range which results in greater penetration of the seismic signal within the sedimentary section.

2. A method as recited in claim 1 where the first method step further comprises,
    a. positioning an exhaust port of the sound generator in the open-ended cylinder one quarter of the cylinder length from one end thereof for providing an optimum seismic energy primary pulse.

3. In offshore marine exploration, a method for increasing the useful seismic energy in a generated primary pulse from the exhaust ports of a sound generator means comprising the steps of,
    a. forming one end of an open-ended cylinder with an area greater than the area of the sound generator means exhaust ports,
    b. positioning an exhaust port of the sound generator internally of the cylinder at one end of the cylinder, and
    c. energizing the sound generator exhaust ports for generating the primary pulse in the cylinder for lowering the dominate frequency of the pulse for deeper penetration.

4. A method as recited in claim 3 wherein the second method step further comprises,
    a. positioning the sound generator exhaust ports in the open-ended cylinder one quarter of the cylinder length from said one end.

5. A highly penetrable seismic energy device for offshore subsurface exploration comprising,
    a. sound generator means having an exhaust port for generating a seismic primary pulse for passing through a sedimentary section,
    b. an elongated cylinder surrounding said sound generator means, and said sound generator means exhaust port is positioned adjacent to one end of said elongated cylinder for lowering the dominate frequency of the generated seismic primary pulse which places more of the energy in the useful seismic frequency range which results in greater penetration of the seismic signal within the sedimentary section.

6. A highly penetrable seismic energy device as recited in claim 5 wherein,
    a. the sound generator means is a high pressure air valve for rapid exhausting of high pressure air from said exhaust port for generating the seismic primary pulse.

7. A highly penetrable seismic energy device as recited in claim 6 wherein,
    a. the sound generator means exhaust port is positioned one quarter of the cylinder length from one end of the cylinder.

8. A highly penetrable seismic energy device as recited in claim 7 wherein,
    a. said high pressure air valve is an air gun for rapid exhausting of high pressure air from said exhaust port for generating the seismic primary pulse.

9. A highly penetrable seismic energy device as recited in claim 5 wherein,
    a. the sound generator means exhaust port is positioned one quarter of the cylinder length from one end of the cylinder.

10. A highly penetrable seismic energy device as recited in claim 9 wherein,
    a. said sound generator means is an air gun for rapid exhausting of high pressure air from said exhaust port for generating the seismic primary pulse.

11. A highly penetrable seismic energy device as recited in claim 5 wherein,
    a. said sound generator means is an air gun for rapid exhausting of high pressure air from said exhaust port for generating the seismic primary pulse.

12. A highly penetrable seismic energy device for offshore subsurface exploration comprising,
    a. pneumatic sound generator means having an exhaust port for the rapid exhausting of pressurized air for generating a seismic primary pulse for passing through a sedimentary section,
    b. an elongated, open-ended cylinder surrounding said pneumatic sound generator means, and
    c. said sound generator means exhaust port is positioned one quarter of the cylinder length from one end of the cylinder for providing greater penetration of the seismic signal within the sedimentary section.

13. A highly penetrable seismic energy device for offshore subsurface exploration comprising,
    a. sound generator means having an exhaust port for generating a seismic pulse for passing through a sedimentary section, b. cylinder means surrounding said sound generator means with said exhaust port positioned one quarter of the cylinder means length from one end of said cylinder means, and
c. said cylinder means being responsive to said position of said sound generator means exhaust port therein for lowering the dominate frequency of the generated seismic pulse for greater penetration of the seismic signal within the sedimentary section.

* * * * *